United States Patent [19]

Corrette

[11] Patent Number: 4,576,033

[45] Date of Patent: Mar. 18, 1986

[54] THREAD ROLLING DIE CONSTRUCTION

[75] Inventor: Richard H. Corrette, Cleveland, Ohio

[73] Assignee: Colt Industries Operating Corp., Cleveland, Ohio

[21] Appl. No.: 558,947

[22] Filed: Dec. 7, 1983

Related U.S. Application Data

[63] Continuation-in-part of Ser. No. 366,979, Apr. 9, 1982, abandoned.

[51] Int. Cl.[4] .............................................. B21H 3/06
[52] U.S. Cl. .......................................... 72/469; 72/71; 72/88
[58] Field of Search .................... 72/469, 88, 90, 365, 72/103, 104, 108, 71; 10/4, 9, 10 R

[56] References Cited

U.S. PATENT DOCUMENTS

| Re. 28,049 | 6/1974 | Orlowmoski et al. | 72/469 |
|---|---|---|---|
| 440,332 | 11/1890 | Rogers | 72/469 |
| 440,333 | 11/1890 | Rogers | 72/469 |
| 444,554 | 1/1891 | Jones | 72/469 |
| 1,946,735 | 2/1934 | Frayer | 72/104 |
| 3,176,491 | 4/1965 | Mau et al. | 72/469 |
| 3,196,654 | 7/1965 | Gordon | 72/88 |
| 3,246,556 | 4/1966 | Phipard, Jr. | 72/88 |
| 3,405,545 | 10/1968 | Orlowmoski | 72/469 |
| 3,405,547 | 10/1968 | Orlowmoski | 72/469 |
| 3,538,739 | 11/1970 | Orlowmoski | 72/469 |
| 3,896,656 | 7/1975 | Orlowmoski | 72/469 |
| 4,301,563 | 11/1981 | Deveney, Jr. | 10/10 R |

Primary Examiner—Daniel C. Crane
Attorney, Agent, or Firm—Pearne, Gordon, Sessions, McCoy, Granger & Tilberry

[57] ABSTRACT

Thread rolling dies for pointed fasteners having an improved working face contour which promotes displacement of blank material from the blank point area at an early stage in the thread rolling sequence to avoid excessive pressures in the die and blank at the finishing stages of the rolling sequence. Thread cutters include an extended section that presurfaces the rise angle of the die working face to produce uniform, improved thread profiles.

2 Claims, 14 Drawing Figures

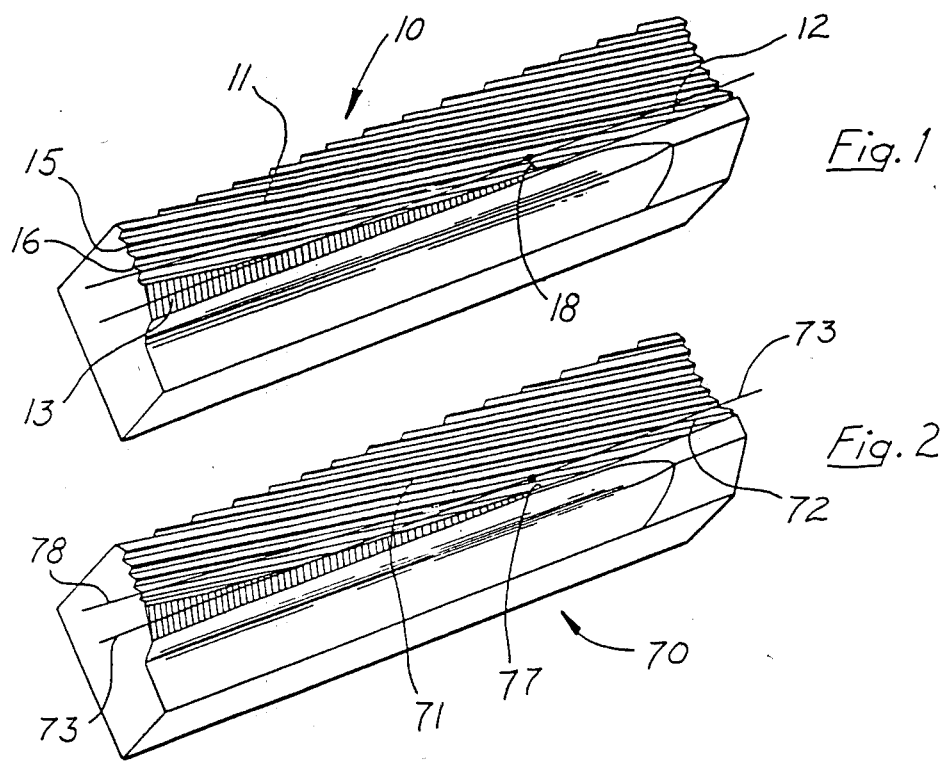
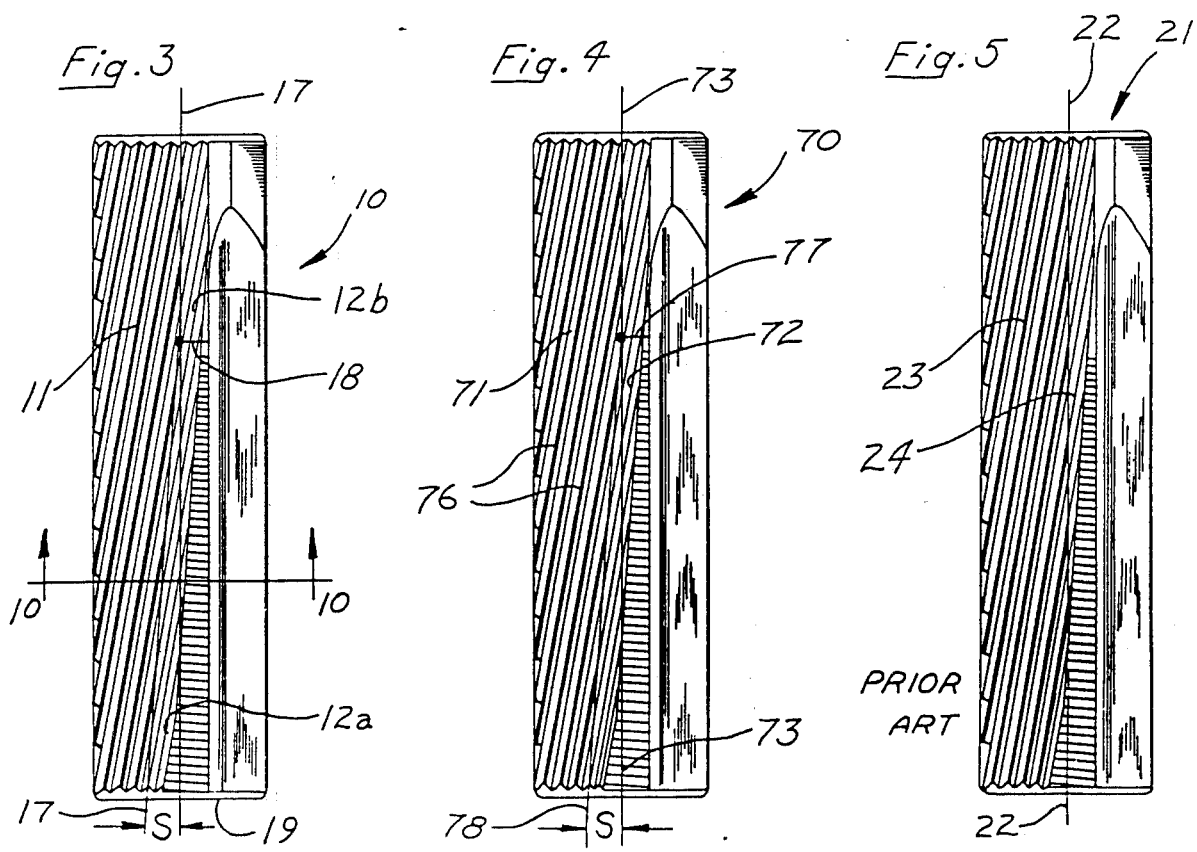

THREAD ROLLING DIE CONSTRUCTION

This is a continuation-in-part of my application Ser. No. 366,979, filed Apr. 9, 1982, now abandoned.

BACKGROUND OF THE INVENTION

The invention relates to thread rolling dies and, more particularly to improvements in dies and methods of their manufacture for making threaded, pointed fasteners.

Prior Art

A style of threaded fastener product sometimes referred to in the industry as a CA type comprises, in addition to the usual head portion at one end, a threaded cylindrical body portion and a point portion which is also threaded at the end opposite the head. The point portion is ordinarily conical which term, hereinafter, means conical or frustoconical. Such fasteners and similar styles are commonly formed by rolling a headed cylindrical blank between an opposed set of thread rolling dies. The dies can be "self-pointing" so as to automatically roll-form a threaded point on the blank simultaneously with the threading operation on the main body of the blank.

The transition area between the point portion and cylindrical portion, as well as the point portion itself in both the product and the dies, are troublesome because of the high degree of working or deformation which is imposed on the blank in these areas. High working pressures in these areas may result in premature failure of the dies, particularly where the die threads in these areas are imperfectly formed. Further, it is sometimes difficult to overcome the tendency for excess blank material to be trapped in these areas, with the result that oversize, out-of-tolerance parts are produced. The difficulties outlined above can be compounded by the procedures currently practiced in manufacturing dies of the general type under consideration. One presently used manufacturing sequence involves the formation of a die preform by milling or other suitable fabricating techniques. The preform, which ordinarily includes a rise angle surface and which may be relatively coarsely formed in a dimensional sense, is made on a machine separate from the machine which ultimately forms the threads on the die. This sequence introduces potential dimensional and geometrical errors from both machines as well as errors in the positioning of the die preform on the die thread forming machine. These dimensional errors are most troublesome in the location or, more accurately, the deviation of the coarse preform rise angle surface from its ideal position when fixtured in the die thread forming machine. Since the rise angle is an inclined plane, it is difficult to compensate or adjust for its improper location by simple horizontal adjustments on the bed of the die thread forming machine. In prior methods of facing the rise angle with threads, deviations of the coarse die preform surface could result in undersize and/or oversize thread forms. As can be understood from the above discussion of the severe service conditions in the point-forming portion and adjacent transition portions of the die, any imperfect thread profiles in these portions can aggravate an already highly stressed area.

SUMMARY OF THE INVENTION

The invention provides, in one aspect, an improved working surface contour in a thread rolling die that increases the quality and uniformity of pointed, threaded product made by the die and improves the potential durability of the die itself. The die working face contour is characterized by a zone which advances the displacement of excess material in the blank towards the slug end early in the thread rolling sequence. Primarily only finish shaping of the threaded part need be accomplished later in the thread rolling sequence. As a result, forces in the die and threaded part are decreased, blank material being shaped is more easily managed, out-of-tolerance parts are more readily avoided, and die life is generally extended.

One disclosed arrangement for contouring the working face of the die to produce early displacement of blank material from the point to the slug involves a shift of the forward end of the rise angle surface into the rolling path of the blank. Thread grooves are cut generally with a uniform depth across the working face of the die. The presence of the forward end of the rise angle surface displaces material into the slug of the blank early in the thread rolling sequence when the cut-off edges of opposed dies have not yet significantly pinched off passage of such material into the slug receiving area of the dies.

The second disclosed arrangement for contouring the die-working face involves the programming of the groove forming tool such that it forms relatively shallow grooves at the forward end of the die G-plane adjacent the heel line as well as the forward area of the rise angle plane. These shallow grooves have the effect of advancing displacement of blank material into the slug in a manner analagous to that described above in connection with an actual shift of the rise angle surface.

In both of the first and second disclosed arrangements mentioned above, the finish portion of the die is formed so that the rise angle surface is not shifted and so that the width of the G-plane or G-surface is uniform along the finish end of the die.

In a third disclosed arrangement, the rise angle surface is shifted or angulated at the finish end of the die, and the width of the G-surface increases as it extends along the finish end of the die. In one such arrangement, the width of the G-surface increases only at the finish end of the die. In another related arrangement, the G-surface increases in width throughout the entire length of the die.

It has been determined that dies of such arrangements tend to produce better points, and that the die life is materially increased.

Another aspect of the invention involves a technique in machining the face of a thread rolling die for pointed, threaded parts in which substantially the entire working surface is cut by the thread cutter. This technique results in a very accurately formed die with close control of the size, shape, and fullness of the thread profiles. As disclosed, the die machining method relies on a cutter having an extended length to provide a lead or preliminary cutting section extending axially from the more conventional thread shaping profile of the cutter. Ideally, the preliminary cutting section extends a distance approximating the die thread spacing. The preliminary cutting section advantageously shapes the area of a future thread on the die preform on each pass of the cutter. In a succeeding pass, the cutter forms a thread on the area previously shaped by the preliminary cutting section. In this manner, the position of a shaped rise angle surface as it is subsequently encountered by the thread profile cutting surfaces of the cutter is precisely controlled. The result is that the thread profile cutting surfaces of the cutter need not remove excessive amounts of material from the die preform and, on the other hand, thread profiles on the rise angle will be completely filled out. Close control of the die thread profile in the area of the rise angle is especially important in the manufacture of high quality, long-life die sets.

The extended length die thread cutter is particularly suited for fabricating the disclosed die having a shifted rise angle plane. As is customary, a die preform is rough-machined or otherwise fabricated with surfaces corresponding to, but somewhat outward of, the G-plane and the rise angle plane. Where the forward end of the rise angle plane is shifted, the rise angle surface exists in two planes intersecting at a "heel". The extended length cutter conveniently and efficiently removes material from the die preform to form the heel hollow. Consequently, the rough fabrication of the die preform is free of this surface complexity.

BRIEF DESCRIPTION OF THE DRAWINGS

FIG. 1 is a perspective view of one embodiment of a self-pointing, thread rolling die constructed in accordance with the invention;

FIG. 2 is a perspective view of a second embodiment of a self-pointing, thread rolling die constructed in accordance with the invention;

FIG. 3 is a plan view of the die of FIG. 1;

FIG. 4 is a plan view of the die of FIG. 2;

FIG. 5 is a plan view of a die illustrating a conventional prior art construction;

In FIGS. 12 through 14, the thread grooves have not been illustrated so that the shapes of the various surfaces are better illustrated. It should be understood, however, that in each finish die, thread forming grooves are provided along both the G-surface and the rise angle surface.

DESCRIPTION OF THE PREFERRED EMBODIMENTS

Figure 6:
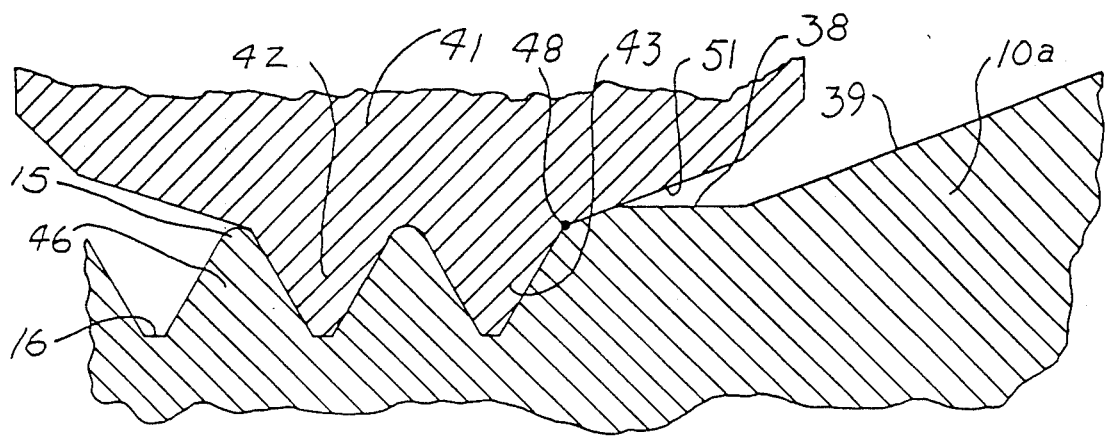
FIGS. 6–8 are sequential, schematic views of a die preform being formed with threads by a method of die manufacture in accordance with the invention.

Referring now to FIGS. 1 and 3, there is illustrated a self-pointing thread rolling die 10 constructed in accordance with the invention. The die 10 is used to roll-form threads on a blank to produce a threaded part, such as a headed screw, bolt, or like fastener. The part produced by the die 10 is characterized by a generally cylindrical main body portion and a conical end or point. As will be more clearly understood from the following disclosure, both the cylindrical main body and point are formed with external threads. In the industry, one type of such fastener is known as a CA type.

The die 10 is fabricated from air hardening tool steel or other suitable material. The working face of the die includes a generally planar G-plane surface 11, a rise angle surface 12, and a cut-off angle 13. The G-plane and rise angle surfaces 11, 12, as discussed in greater detail below, have ridges 15 and intervening grooves 16 formed substantially throughout their respective areas. The grooves 16 on these respective surfaces, for the most part, are of uniform depth. The ridges 15, or, more properly, the crest of the ridges of the G-plane area, lie substantially in a common plane which in FIG. 3 is parallel to the plane of the drawing. The ridges 15 of the rise angle surface 12 lie in substantially two planes 12a, 12b, which intersect the G-plane 11 along a heel line 17 and which intersect each other at a line 18, where the heel line 17 is slightly folded.

Study of the folded heel line 17 in FIG. 3 reveals that adjacent a forward end 19 of the die 10 of the forward rise angle plane 12a has been shifted to the left a distance from where it would be if it were coplanar to (i.e., an extension of) the rearward rise angle plane 12b. The shift of the forward rise angle plane 12a at the forward end 19 of the die is indicated at "S" which is the distance between the front portion of the heel line 17 and an imaginary extension of the rear portion of the heel line. The distance "S" is preferably in the order of one-half to one thread pitch, but may be in the range of between one-half and three pitches approximately. It will be understood that the forward and rearward rise angle planes 12a, 12b are inclined with respect to the G-plane 11 by essentially the same angle, which normally is in the range of approximately 15° to 25°, and is directly related to the cone angle of the point of the threaded part that it forms.

For purposes of comparison and understanding of the invention, there is shown in FIG. 5 a schematic representation of a prior art die 21. Inspection of FIG. 5 reveals that a heel line 22 between a G-plane 23 and a single rise angle plane 24 is straight along the length of the die and, as will be understood by those who are familiar with the art, is parallel to the rolling direction of a blank.

For the sake of simplicity, the dies illustrated in FIGS. 1 through 5 and 12 through 14 are intended to represent the important features of both the long and the short dies of a set. The inventive concepts disclosed herein are compatible with the presence of tapered roll-on and roll-off areas in a short die, for example. As is the case with conventional die sets, the die 10 cooperates with a substantially identical, opposed, spaced die to roll threads on cylindrical blanks in a generally known manner.

Figure 10:
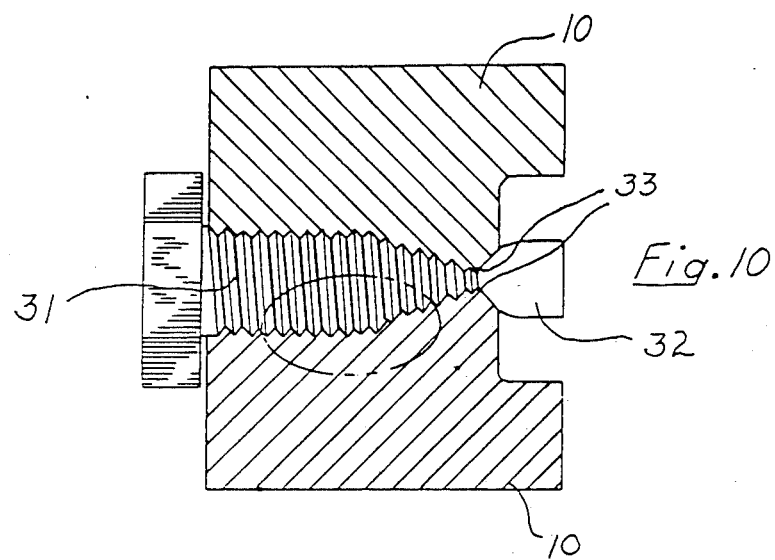
FIG. 10 is an enlarged, cross-sectional view of a pair of opposed cooperating dies engaged with a blank in an intermediate stage in a thread rolling process generally corresponding to the position indicated at the line 10—10 in FIG. 3.
Figure 11:
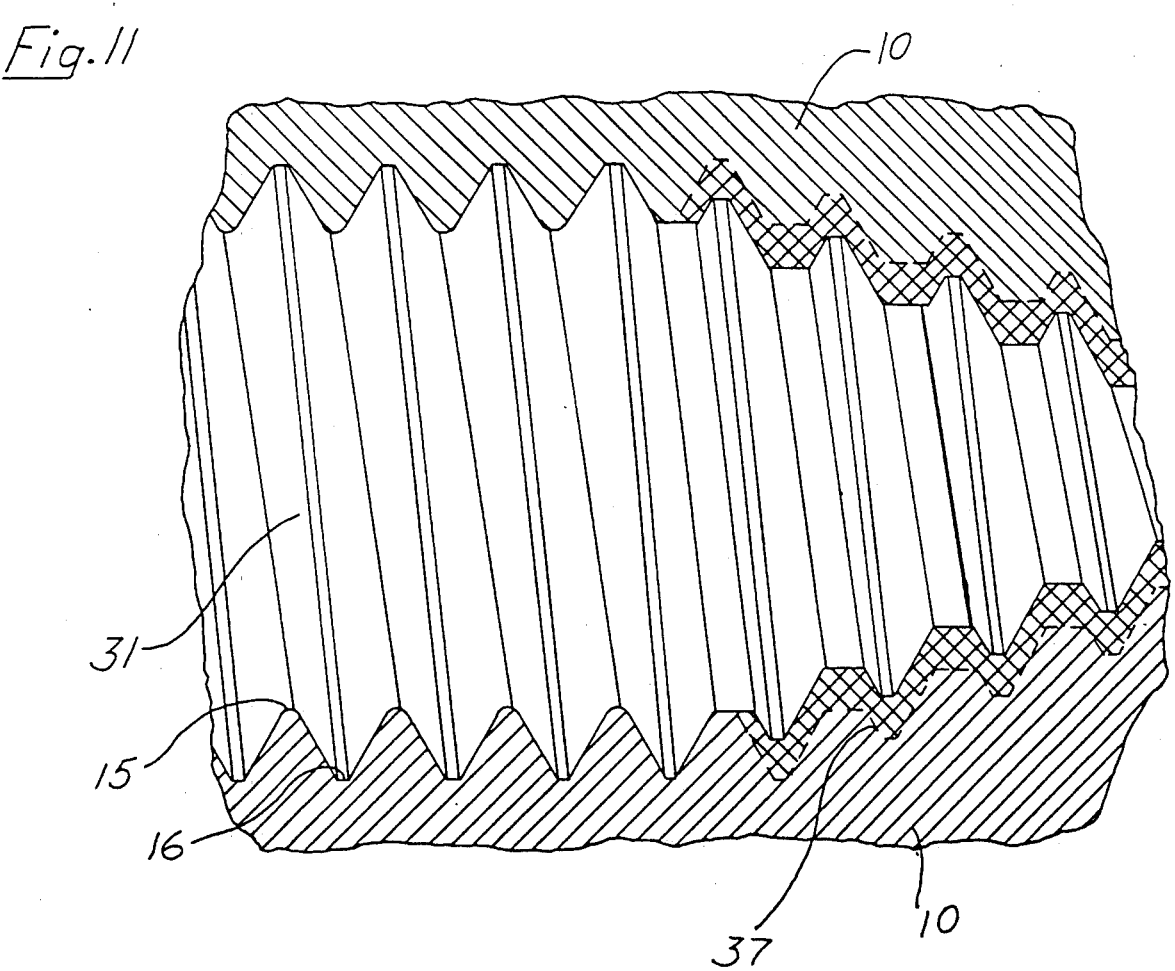
FIG. 11 is a greatly enlarged, cross-sectional, schematic view of the point and adjacent areas of the blank illustrated in the area enveloped by the broken-line oval in FIG. 10.

The contour of the working surface of the disclosed die 10 resulting from the shift of the forward portion 12a of the rise angle surface 12 into the path of a blank effects a relatively early displacement of blank material from the eventual point area of the blank. More specifically, with particular reference to FIGS. 10 and 11, where opposed dies 10 radially constrict a blank 31 it is seen that the die profile at the rise angle surface 12a is displacing material axially into a slug area 32 of the blank. The view of FIGS. 10 and 11 is taken early in the thread rolling sequence where a blank 31 would be approximately at the line 10—10 in FIG. 3. It is seen that the cut-off edges, designated 33, of the opposed dies 10 at this stage of the rolling sequence depicted in FIG. 10 do not greatly restrict axial displacement of blank material into the slug 32. As a consequence, in later stages of the rolling sequence, where the point of the blank 31 rolls up the cut-off edges 33, there is a reduced requirement for axial displacement or flow of blank material from the area of the point. The point of the blank 31 in this later stage of the thread rolling sequence primarily needs only to be finished shaped.

The above-described circumstances can be more completely understood from study of FIG. 11. The shifted forward rise angle is indicated at 12a. Superposed on FIG. 11 is the rise angle plane 24 of the prior art die 21 represented by the phantom threads 37. As has been explained above, the rise angle plane 24 of the prior art die 21 is parallel to the rolling direction. The double cross-hatch area in FIG. 11 represents a measure of the volume of blank material which is displaced early in the thread rolling sequence as compared to the rolling sequence produced by the prior art die 21.

Early displacement of blank material from its point, as accomplished by the disclosed contour of the die 10, affords the benefits of reduced pressures and forces in the blank 31 and die 10. Such reduced pressures make it easier to produce parts within tolerance, reduce wear rates on the die, and reduce the risk of premature failure of the die in the rise angle surface area 12 and in the G-plane area 11 immediately adjacent the rise angle surface 12.

Figure 12:
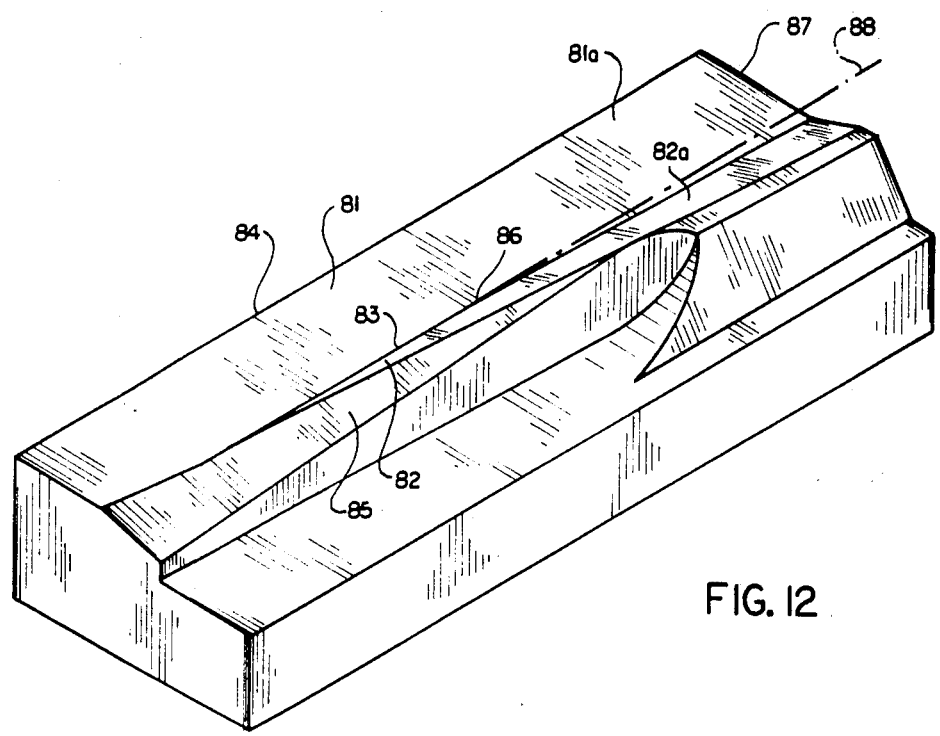
FIG. 12 is a perspective view of the die in accordance with the third arrangement, in which the width of the G-surface increases along the finish end of the die.
Figure 13:
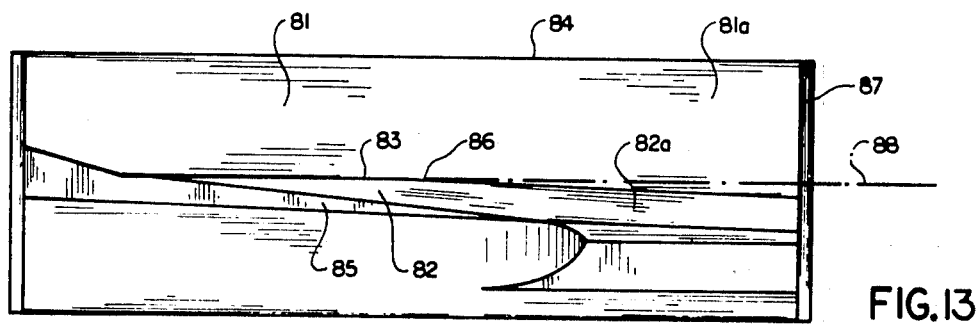
FIG. 13 is a plan view of the die illustrated in FIG. 12.

FIGS. 12 and 13 are perspective and plan views of another embodiment. In such embodiment, the die provides a G-surface 81 intersecting the rise angle surface 82 along a heel line 83, which is parallel to the edge 84 of the die to a point 86. Such point 86 is normally located about at the middle of the die from the start end thereof. Angled back from the edge of the rise angle surface 82 opposite the G-surface is a cut-off surface 85. From the point 86 to the finish end of the die 87, the rise angle surface is angulated a small amount away from the die edge 84 to provide an angulated portion 82a of the rise angle surface. Because the portion 82a is angulated back from the edge 84, the portion 81a of the G-surface has an increasing width from the point 86 to the finish end of the die. This is illustrated by the phantom line 88, which is an extension of the heel line 83 along the forward end of the die.

By providing this angulation of the rise angle surface 82 toward the finish end 87 of the die, a relief is provided allowing for the axial displacement of material into the cylindrical body as the threads are finished along both the body and point area of the fastener. Such displacement has, in the past, caused excessive pressures adjacent to the heel line at the finish end of the die. Such excessive pressure tends to cause premature die wear.

FIG. 12 illustrates still another embodiment, in which the heel line 91 between the G-surface 92 and the rise angle surface 93 is angulated with respect to the edge 94 throughout the length of the die. This is illustrated by the angle between the heel line 91 and a phantom line 96 which is parallel to the edge 94. Here again, the angulation of the rise angle surface promotes the displacement of the blank material into the slug zone of the blank which is cut off during the rolling operation and, in addition, relief is provided during the finishing operations to permit axial flow of material as the cylindrical body portion tends to expand axially during the finishing operation of the threads. This tends to relieve excessive pressure which would otherwise occur.

It has been found in actual practice that fasteners rolled with dies in accordance with this invention tend to have a better point configuration and more uniform threads. Further, it has been found that, on the average, about twice as many good quality fasteners can often be produced with a given pair of dies when compared to the prior art dies of the type illustrated in FIG. 5.

Figure 14:
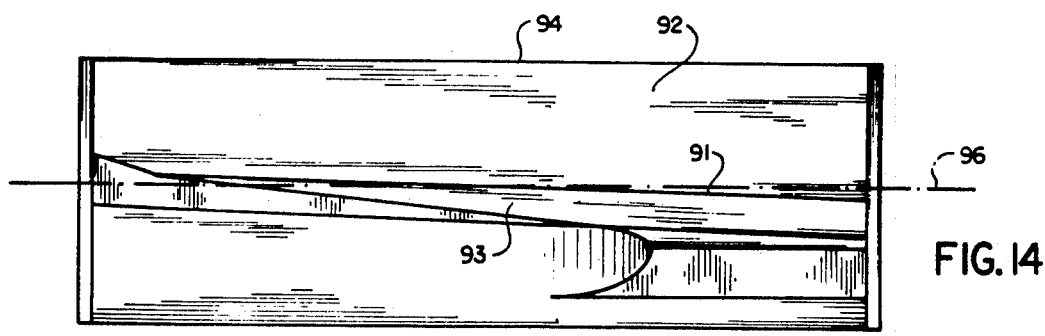
FIG. 14 is a plan view of a die in which the width of the G-surface increases throughout the length of the die.

In the finished dies of FIGS. 12 through 14, of course, thread forming grooves of the type illustrated in FIGS. 1 through 4 are formed along both the G-surfaces and the rise angle surfaces. For purposes of illustration, in order to better illustrate the shape and relationship of the various surfaces, such grooves have not been illustrated in FIGS. 12 through 14.

Figure 7:
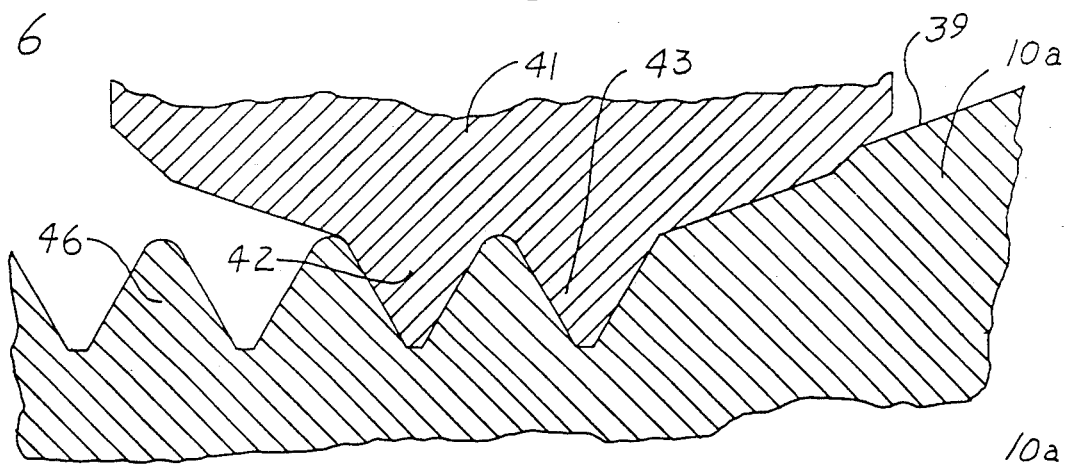
Figure 8:
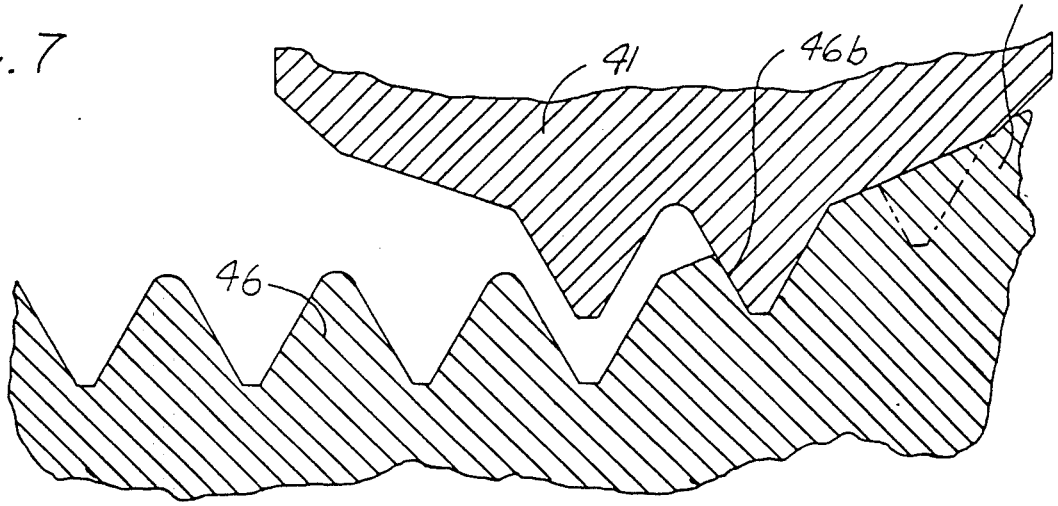

Formation of the G-plane and rise angle surfaces 11, 12 of the die 10 is explained with particular reference to FIGS. 6-8. A die preform 10a is machined or otherwise formed with the general shape of the finished die 10 but with excess stock in the area of the working face. In a simple and economical form, the die preform 10a can be milled or otherwise shaped as a prism such that where the G-plane and rise angle surfaces 11, 12 will be formed there are provided only two outward "rough-cut" planes, one 38 corresponding to the G-plane 11, and the other 39 enveloping both of the forward and rearward rise angle planes 12a and 12b. The rough-cut rise angle plane 39 can, for example, extend approximately parallel to the rearward or finished rise angle plane 12b but be disposed leftwardly as viewed in FIGS. 1, 3 and 6-8 of the extreme forward end of the forward rise angle plane 12a.

The thread ridges 15 and grooves 16 of the die are formed by a tool 41 in the form of a single point milling wheel cutter 41 having axially spaced ribs 42, 43. In FIGS. 6-8, the fragmentary cross section of the periphery of the milling wheel cutter 41 is shown. It will be understood that the wheel cutter, in accordance with conventional practice, rotates about an axis above and parallel to the G-plane and transverse to the lead angle of the die threads formed by the alternating ridges and grooves 15, 16. The cutter wheel 41 also translates relative to the die preform 10a along paths parallel to the lead angle. The wheel cutter 41 is programmed to translate along successive paths, index-spaced a distance equal to the required spacing of the ridges and grooves 15, 16 of the threads 46. It will be seen from FIGS. 6 and 7 that the cutter 41 cuts at a depth sufficient to completely remove the rough-cut G-plane 38.

As indicated in FIGS. 1 and 3, the direction of the threads 46 along the lead angle is oblique to the heel line 17 so that at least some of the individual threads 46 cross both the G-plane 11 and rise angle surfaces 12a, 12b. Consequently, the program controlling motion of the wheel cutter 41 includes the imposition of suitable lift (or drop depending on cutting direction) above the G-plane as it passes over and forms the individual rise angle surfaces 12a, 12b. The cutter program can be embodied in a conventional medium such as a three-dimensional cam or a numerical control. In the illustrated case, the cutter elevation above the die preform 10a is controlled so that a point designated generally at 48 on the root area of the profile of the rightward rib 43 of the cutter 41 lies in the planes 12a, 12b of the rise angle surfaces as these planes are being formed.

In accordance with one aspect of the invention, the cutter tool 41 is provided with an integral preliminary die shaping surface 51. This preliminary cutting section 51 is generally conical and has an axial length, measured from the root area 48 of the adjacent cutter rib 43, of preferably the center-to-center distance between the cutter ribs 42, 43. As will be understood by those skilled in the art, the axial spacing between the cutter ribs 42, 43 corresponds to the distance the cutter wheel is indexed between each pass over the working face of the die. The preliminary shaping surface 51 sizes the area of the die preform 10a to be cut during the next pass of the wheel cutter 41, it being understood that the wheel cutter is indexed from left to right in the various figures. Thus, without additional machining, set-up and the like, the cutter wheel ribs 42, 43 are presented with an accurately formed and positioned surface as they progress over the rise angle planes 12a, 12b. This result is highly advantageous since very accurate and repeatable thread profiles, designated 46b, can be produced on the rise angle surfaces 12a, 12b. The risk of insufficient stock being available to completely fill out the crest of the die threads 46 in the rise angle surfaces 12, 12b is avoided by providing a die preform 10a with assuredly adequate, i.e., excess, stock in the rise angle area. Since the preliminary die cutter surface 51 is operative simultaneously with the cutter ribs 42, 43, there is no penalty paid in machine time to pre-size the rise angle area and remove excess stock. FIGS. 6, 7, and 8 illustrate three successive passes of the wheel cutter 41 over the die preform 10a in the transition area of the heel line 17 between the G-plane 11 and rise angle surface 12. In FIG. 6, the wheel cutter 41 is cutting the last thread in the G-plane 11 while the preliminary cutting surface 51 is forming the beginning of the rise angle surface 12. In FIG. 8, the wheel cutter 41 has been lifted away from the G-plane 11 to satisfy the condition that the root area 48 of the adjacent cutter rib 43 lies in the rise angle plane 12. It will be noted that the angle of the conical preliminary cutting surface 51 is substantially identical to the angle that the rise angle surface 12 forms with the G-plane 11.

Figure 9:
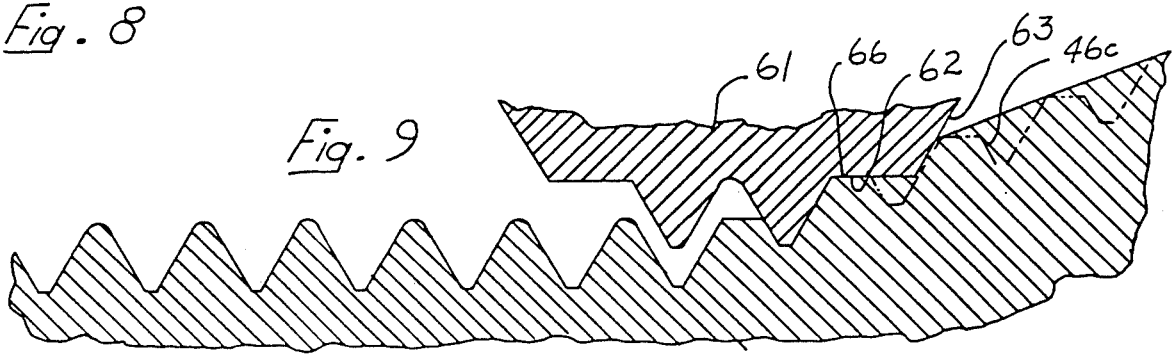
FIG. 9 is a view similar to FIG. 8 but illustrating a second thread cutter style and novel thread profile in the rise angle portion of the die.

In FIG. 9, there is shown a modified form of a wheel cutter where integral, extended cutting surfaces 62, 63 preliminarily face a rise angle surface. The extended surfaces provide a stepped cross section in the cutter wheel extension, including a generally cylindrical portion 62 concentric about the axis of the wheel cutter 61 and an outer conical portion 63, likewise concentric about the cutter wheel axis. The axial length of the cylindrical cutter extension 62 is preferably sufficiently long to at least extend across the upper face of the crest 66 of threads 46c on the rise angle plane, while the conical cutter portion 63 has sufficient axial length when combined with the length of the cylindrical portion 62 to sweep substantially the full area covered by the adjacent cutter rib 43 in the latter's subsequent pass over the die preform. The cutter wheel 61 is operated in essentially the same manner as that described in connection with the wheel cutter 41 of FIGS. 6 through 8. The wheel cutter 61 shown in FIG. 9 produces a modified thread form 46c in the rise angle surface where the crest 66 of the threads in this surface are substantially parallel to the G-plane. The die threads 46c in this area, because of their blunt profile and equal angles on each corner, are relatively strong. Since the crests 66 are flat, the resulting thread depth in the rise angle is less, so that the die is stronger in this area. Another advantage of the die illustrated in FIG. 11 is that the minor diameter of a threaded part made by it will be larger at any given spot on the point than that on a similar part made with a conventional die with angled crests. This effective increase in diameter along the point of a part reduces the tendency of the point to break off during the thread rolling process.

The disclosed wheel cutters 41, 61 having their respective axial extensions 51, 62, 63 are particularly useful in producing the disclosed workface contour of the die 10 of FIGS. 1 and 3. These extensions 51, 62, 63 readily remove excess material of the die preform in the heel area or hollow of the rise angle planes resulting from the forward rise angle surface 12a being shifted out of the plane of the rear rise angle surface 12b.

It will also be noted that with both embodiments of the wheel cutter 41, 61, the entire rough-cut rise angle surface of a die preform is accurately pre-machined just prior to cutting of the thread profiles on these rise angle surfaces so that the final thread profiles cannot be influenced by the original configuration of the rough-cut area in the rise angle zone of the die preform. While it is desirable that the preliminary cutter extensions 41, 61 have an axial length sufficient to cover the full area cut by the ribs 41, 42 on their subsequent pass, these extensions can serve the desirable function of precisely forming the crests of the threads in the rise angle surface if they are at least sufficiently long to extend over the crest area of the next-to-be-formed thread. The cutters 41, 61 can be of any suitable tool style, such as rotary milling cutter, grinding wheel, and the like having a profile complementary to the die threads.

FIGS. 2 and 4 illustrate a modified die 70 with a working face contour which, like that of the embodiment of FIGS. 1 and 3, when compared to the prior art working face contour of the die of FIG. 5, effects displacement of material from the point area of a blank at a relatively early stage in the thread rolling sequence. This modified die 70 has a G-plane 71 and a single rise angle plane 72 which is inclined with respect to the G-plane and intersects it along a straight heel line 73 parallel to the rolling direction or path of a blank. The die 70 is produced by facing its G-plane and its effective rise angle surface with a cutter such as that disclosed in FIGS. 6 through 8 or 9, or a conventional cutter not having a preliminary cutting extension.

In forming threads 76 on the die 70, the motion of the wheel cutter is modified by prematurely withdrawing or raising the cutter wheel in the forward end of the die immediately adjacent and in the rise angle plane 72. More particularly, an imaginary plane analogous to the forward rise angle plane 12a of the die of FIGS. 1 and 3 is assumed to present a barrier or reference plane. This imaginary reference plane has essentially the same inclination to the G-plane 71 as the real rise angle plane 72, intersects the real rise angle plane at a line 77, and intersects the G-plane along an imaginary heel line 78. The cutter produces the die of FIGS. 2 and 4 by a cutting program which regards the described imaginary plane as real, so that in the forward portion of the die 70, both in the G-plane 71 rightward of the imaginary heel line 78 and in the real rise angle plane, the depth of the grooves of the threads 76 is relatively shallow. The shallow grooves in this zone afford a reduced volume or clearance for material in the point area of a blank being rolled by the die 70 so that early in the thread rolling sequence, excess material in the area of the blank to be pointed is displaced axially into the slug.

Although the preferred embodiments of this invention have been shown and described, it should be understood that various modifications and rearrangements of the elements and steps may be resorted to without departing from the scope of the invention as disclosed and claimed herein. While the disclosed dies are of the self-pointing type, it will be understood that the principles of the invention are applicable to other types of dies which have a rise angle surface or like structure but are not used to originally form a point (where the blank is pointed before it is introduced to the dies) and/or to cut off a slug. Examples of other types of dies with which the invention may be employed are those used to manufacture fasteners commercially known as type F and those marketed under the registered trademark SWAGEFORM.

What is claimed is:

1. A cut-off die for pointing and threading unpointed blanks having a cylindrical shank comprising a block having a working face extending from a start end to a finish end, said working face providing:
   a G-surface extending from said start end to said finish end operable to produce threads on a cylindrical portion of a fastener produced from said blanks;
   a rise angle surface angled forwardly from one edge of said G-surface operable to form and thread a point on said fastener, said rise angle surface terminating in an edge extending along the length of said block, said G-surface being located in a forward area of said die such that the forwardly angled rise angle faces toward said forward area; and
   a cut-off surface operable to separate a slug of excess material at the pointed end of said fastener from said blanks, said cut-off surface being angled rearwardly from the edge of said rise angle surface remote from said G-surface, said cut-off surface being in nonparallel relationship to said G-surface;
   said G-surface and said rise angle surfaces intersecting along a heel line;
   said G-surface providing increasing width in the direction toward said finish end along at least a portion thereof laterally aligned with said rise angle surface causing said heel line to be angulated with respect to the length of said working face along said portion and operating to reduce pressure on said G-surface and rise angle surface, said G-surface having a uniform width along a second portion thereof laterally aligned with said rise angle surface substantially adjacent to said start end.

2. A die for forming external threads on a cylindrical pointed fastener comprising a block having a working face extending from a start end to a finish end, said working face providing:
   a G-surface extending from said start end to said finish end operable to produce threads on a cylindrical portion of a fastener;
   a rise angle surface angled relative to said G-surface from one edge of said G-surface and operable to thread a point on said fastener;
   said G-surface and said rise angle surface intersecting along a heel line;
   said G-surface providing increased width in a direction toward said finish end along at least a portion thereof laterally aligned with said rise angle surface causing said heel line to be angulated with respect to the length of said working face along said portion and operating to reduce pressure on said G-surface and rise angle surface;
   said G-surface having a uniform width along a second portion thereof laterally aligned with said rise angle surface and substantially adjacent to said finish end.

* * * * *